United States Patent
Hosoya et al.

(10) Patent No.: US 11,025,793 B2
(45) Date of Patent: Jun. 1, 2021

(54) POWER SUPPLY CONTROLLING APPARATUS AND IMAGE FORMING APPARATUS

(71) Applicants: Junpei Hosoya, Kanagawa (JP);
Tomoyuki Yamashita, Kanagawa (JP);
Norikazu Okada, Kanagawa (JP);
Takaaki Hirasawa, Kanagawa (JP);
Shunta Yamahori, Kanagawa (JP)

(72) Inventors: Junpei Hosoya, Kanagawa (JP);
Tomoyuki Yamashita, Kanagawa (JP);
Norikazu Okada, Kanagawa (JP);
Takaaki Hirasawa, Kanagawa (JP);
Shunta Yamahori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/751,475

(22) Filed: Jan. 24, 2020

(65) Prior Publication Data
US 2020/0244832 A1    Jul. 30, 2020

(30) Foreign Application Priority Data

Jan. 28, 2019 (JP) .............................. JP2019-012590
Jan. 10, 2020 (JP) .............................. JP2020-003247

(51) Int. Cl.
*H04N 1/00*        (2006.01)
(52) U.S. Cl.
CPC ..... *H04N 1/00899* (2013.01); *H04N 1/00896* (2013.01); *H04N 1/00901* (2013.01)

(58) Field of Classification Search
CPC combination set(s) only.
See application file for complete search history.

(56) References Cited

U.S. PATENT DOCUMENTS

| | | | |
|---|---|---|---|
| 7,629,780 B2 | 12/2009 | Ogawa | |
| 9,083,185 B2 | 7/2015 | Okada | |
| 9,300,136 B2 * | 3/2016 | Chosokabe | H04N 1/00901 |
| 9,661,169 B2 * | 5/2017 | Yamashita | H02J 7/0063 |
| 2014/0153294 A1 * | 6/2014 | Deboy | H02M 3/33569 |
| | | | 363/21.04 |
| 2015/0244207 A1 * | 8/2015 | Narita | H02J 9/061 |
| | | | 307/64 |
| 2016/0336799 A1 | 11/2016 | Iwata et al. | |
| 2018/0115176 A1 * | 4/2018 | Ye | H02J 7/007 |

(Continued)

FOREIGN PATENT DOCUMENTS

| | | |
|---|---|---|
| JP | H07-320752 | 12/1995 |
| JP | 2535913 B2 * | 9/1996 |

(Continued)

*Primary Examiner* — Helen Zong
(74) *Attorney, Agent, or Firm* — IPUSA, PLLC

(57) ABSTRACT

A power supply controlling apparatus includes a first power supply unit that supplies DC power to a load using power supplied from a commercial power supply, a power detecting unit that detects an input voltage and an input current input from the commercial power supply to the first power supply unit, and a control unit that controls the input current to be a constant current having an upper limit current value in response to the input voltage by controlling DC power supplied to the load from the first power supply unit based on the input voltage and the input current which are detected by the power detecting unit.

11 Claims, 11 Drawing Sheets

(56) References Cited

U.S. PATENT DOCUMENTS

2019/0037660 A1* 1/2019 Rucker ............... H05B 47/16
2019/0393692 A1* 12/2019 Tomioka ............... H02H 3/18
2020/0313561 A1* 10/2020 Moore ............... H02M 1/08

FOREIGN PATENT DOCUMENTS

| JP | H09-322433 | 12/1997 |
| JP | 2004-208479 | 7/2004 |
| JP | 2007-143340 | 6/2007 |
| JP | 2018-093626 | 6/2018 |

* cited by examiner

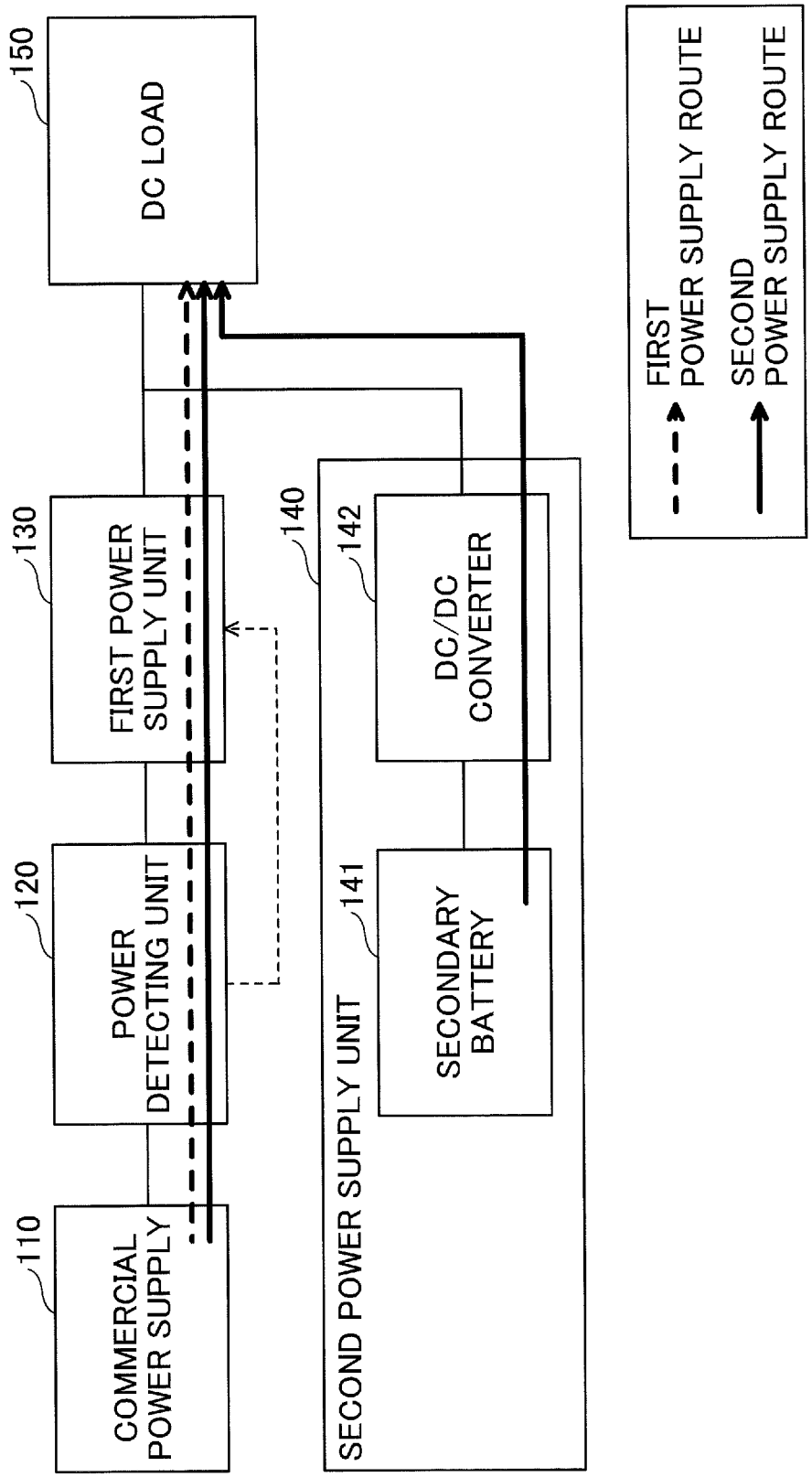

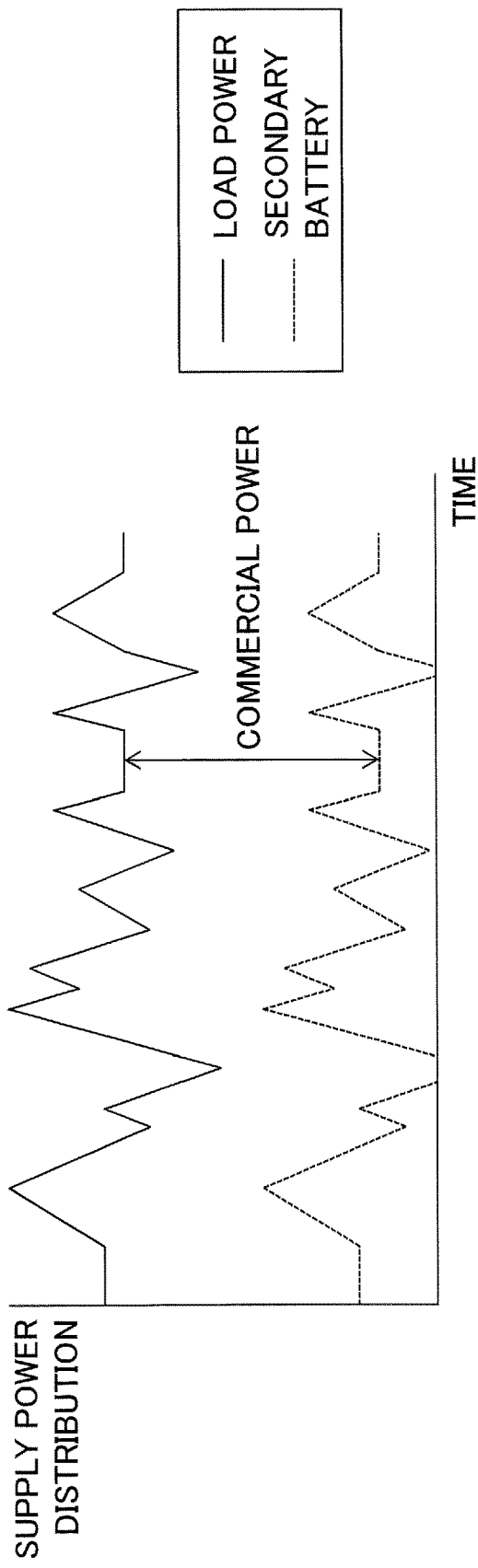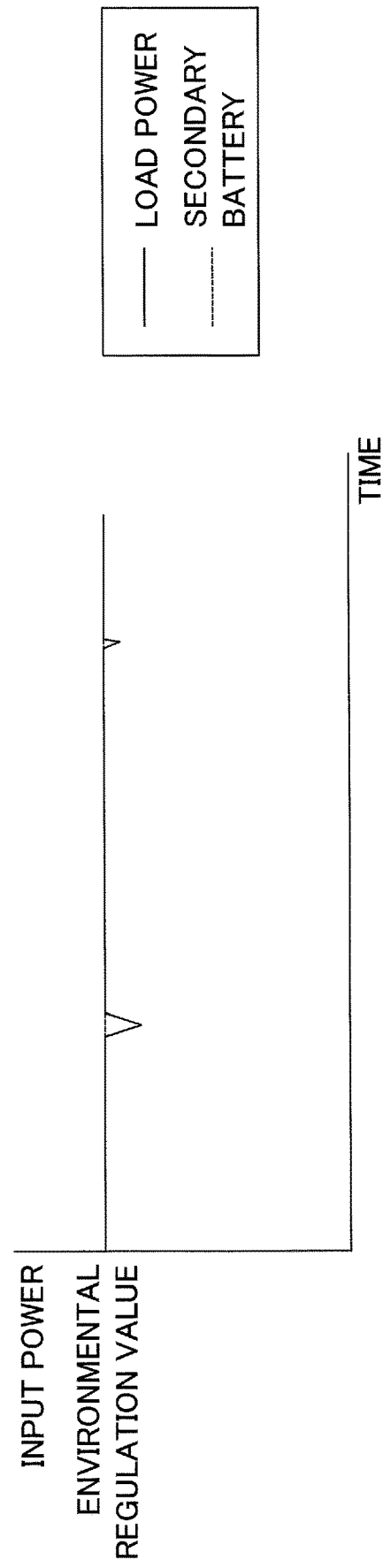

FIG.4

| ENVIRONMENTAL REGULATION VALUE (0.3 W) | INPUT VOLTAGE | | |
|---|---|---|---|
| | 100 V | 110 V | 120 V |
| UPPER LIMIT CURRENT VALUE | 3 mA | 2.7 mA | 2.5 mA |

POWER SUPPLY CONTROLLING APPARATUS AND IMAGE FORMING APPARATUS

CROSS-REFERENCE TO RELATED APPLICATIONS

This application is based on and claims priority to Japanese Patent Application No. 2019-012590, filed on Jan. 28, 2019 and Japanese Patent Application No. 2020-003247, filed on Jan. 10, 2020, the entire contents of which are incorporated herein by reference.

BACKGROUND OF THE INVENTION

Field of the Invention

The present invention relates to a power supply controlling apparatus and image forming apparatus.

Description of the Related Art

With regard to a power supply controlling apparatus, a technique is known in which a first power supply unit for supplying power from a commercial power supply unit and a second power supply unit for supplying power from a secondary battery are provided, and power is supplied to a load at the same time from both the first power supply unit and the second power supply unit.

For example, Patent Document 1 discloses a technique of controlling the ratio of DC power supplied to a load from a main power supply unit and an UPS power supply unit to be a predetermined value in a UPS power supply apparatus including the main power supply unit using a commercial power supply as a power supply and the UPS power supply unit using a battery as the power supply.

However, in the conventional power supply control, because a current ratio between the main power supply unit and the UPS power supply unit is controlled to be constant, the input power from the commercial power supply unit is also increased or decreased in accordance with an increase or decrease of a load current.

For example, when the load current is 50 mA, when the input power from the commercial power supply is configured to be the upper limit value (environmental regulation value), when the load current is increased to at least 50 mA, the input power exceeds the environmental regulation value, and when the load current is reduced to be lower than 50 mA, the input power does not satisfy the environmental regulation value.

[Patent Document 1] Japanese Laid-Open Patent Application No. H9-322433

As described above, in this power supply control, the input power from the commercial power supply cannot be appropriately controlled in accordance with a load current.

In order to solve the above problems, the object of the present invention is to enable an appropriate control of the input power from the commercial power supply in response to the load current.

SUMMARY OF THE INVENTION

A power supply controlling apparatus includes a first power supply unit that supplies DC power to a load using power supplied from a commercial power supply, a power detecting unit that detects an input voltage and an input current input from the commercial power supply to the first power supply unit, and a control unit that controls the input current to be a constant current having an upper limit current value in response to the input voltage by controlling DC power supplied to the load from the first power supply unit based on the input voltage and the input current which are detected by the power detecting unit.

BRIEF DESCRIPTION OF THE DRAWINGS

FIG. 1 illustrates a schematic configuration of a power supply controlling apparatus according to an embodiment of the present invention.

FIGS. 2A and 2B illustrate examples of control of input power by the power supply controlling apparatus according to an embodiment of the present invention.

FIG. 4 is a diagram illustrating an example of a setting table provided by the power supply controlling apparatus according to the first embodiment of the present invention.

DESCRIPTION OF THE EMBODIMENTS

Embodiment

Figure 3:
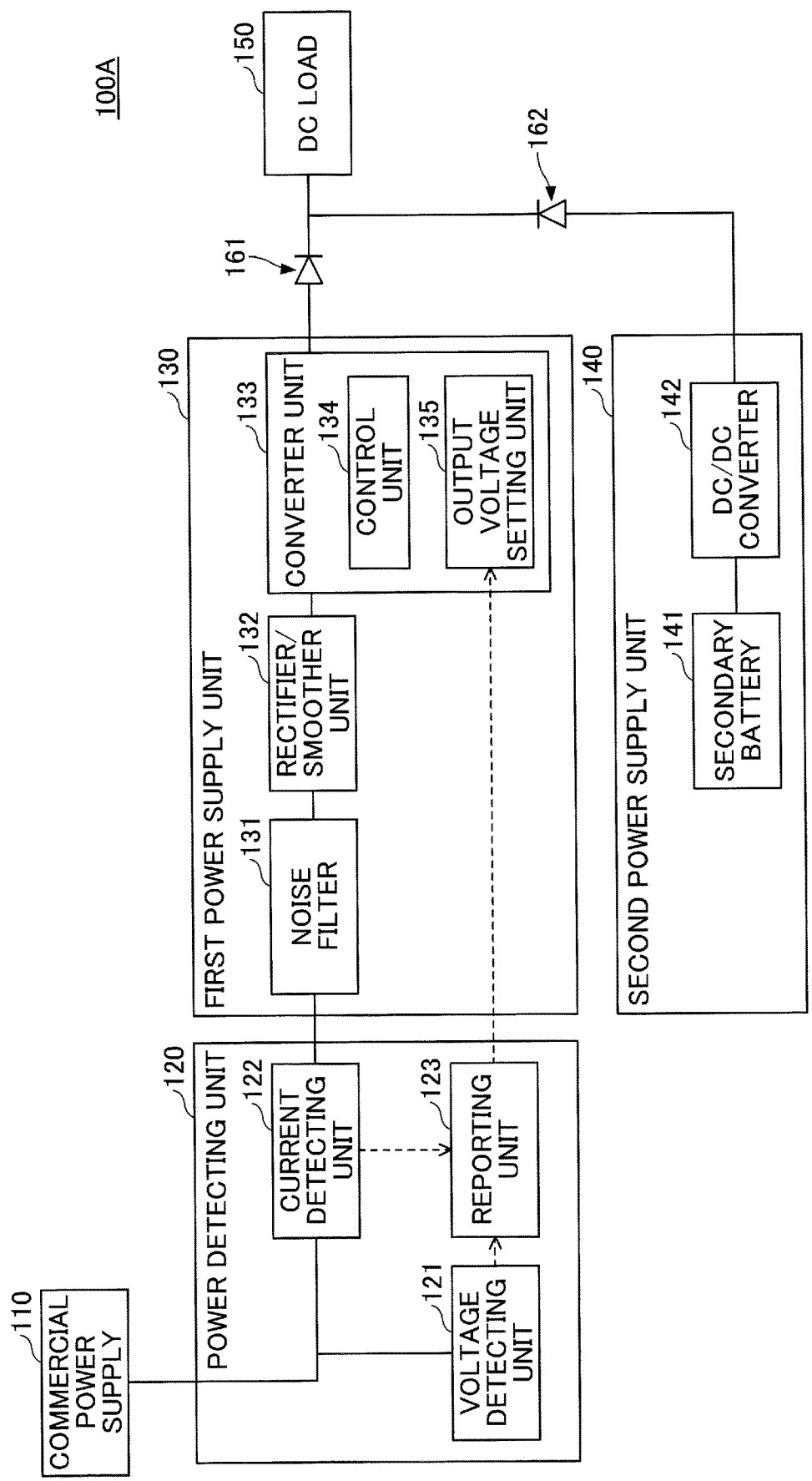
FIG. 3 is a diagram illustrating a configuration of the power supply controlling apparatus according to a first embodiment of the invention.

Hereinafter, one embodiment of the present invention will be described with reference to figures.

(Outline of Power Supply Controlling Apparatus 100)

FIG. 1 illustrates a schematic configuration of a power supply controlling apparatus 100 according to the embodiment of the present invention.

As illustrated in FIG. 1, the power supply controlling apparatus 100 includes a commercial power supply 110, a power detecting unit 120, a first power supply unit 130, a second power supply unit 140, and a DC load 150. The second power supply unit 140 includes a secondary battery 141 and a DC/DC converter 142.

The first power supply unit 130 supplies DC power to the DC load 150 using commercial power (AC power) supplied from the commercial power supply 110. The second power supply unit 140 supplies DC power (voltage converted by the DC/DC converter 142) to the DC load 150 using the power (DC power) supplied from the secondary battery 141. The second power supply unit 140 always outputs a constant voltage by a constant voltage control using the DC/DC converter 142. The power detecting unit 120 detects the input voltage and the input current input from the commercial power supply 110 to the first power supply unit 130.

As illustrated in FIG. 1, the power supply controlling apparatus 100 has a first power supply route and a second power supply route as a power supply route for the DC load 150. The first power supply route is the route that supplies power to the DC load 150 only from the first power supply unit 130 (i.e., the commercial power supply 110). The second power supply unit is from both the first power supply unit 130 and the second power supply unit 140 (i.e., the commercial power supply 110 and the secondary battery 141) to provide power to the DC load 150.

Here, with regard to the "second power supply route" using the secondary battery 141 in accordance with the present embodiment, the power supply controlling apparatus 100 includes a power detecting unit 120 disposed between the commercial power supply 110 and the first power supply unit 130, and the power detecting unit 120 monitors the power input from the commercial power supply 110 to the first power supply unit 130, and controls the output of the first power supply unit 130 so that the power does not exceed an environmental regulation value.

Accordingly, the power supply controlling apparatus 100 in accordance with the present embodiment can maintain the input power from the commercial power supply 110 at the environmental regulation value even when the load current fluctuates, and thus can efficiently use the commercial power supplied from the commercial power supply 110.

Further, the power supply controlling apparatus 100 according to the present embodiment can increase the hour of use of the secondary battery 141 for a longer time because the power supplied from the secondary battery 141 is not used when the load power can be supplied only by the commercial power. In addition, the secondary battery 141 having a relatively small capacity may be used to reduce the cost and size of the secondary battery 141.

(Example of Input Power Control by Power Supply Controlling Apparatus 100)

FIGS. 2A and 2B are diagrams illustrating an example of control of input power by the power supply controlling apparatus 100 according to the embodiment of the present invention. In FIG. 2A, the load power is illustrated as a solid line and the power supplied from the secondary battery 141 to the DC load 150 is illustrated using a dotted line. That is, the power supplied from the commercial power supply 110 to the DC load 150 is the difference between the load power and the power supplied from the secondary battery 141 to the DC load 150.

As illustrated in FIG. 2A, in the power supply controlling apparatus 100 in accordance with the present embodiment, the power supplied from the commercial power supply 110 to the DC load 150 and the power supplied from the secondary battery 141 to the DC load 150 increase or decrease according to the increase or decrease of the load power. However, as illustrated in FIG. 2B, the power supply controlling apparatus 100 in accordance with the present embodiment monitors the input power input from the commercial power supply 110 to the first power supply unit 130 by the power detecting unit 120, and thus the output of the first power supply unit 130 is controlled so that the input power is constant in the environmental regulation value.

The power supply controlling apparatus 100 can perform a "first operation mode" and a "second operation mode". The "second operation mode" is an operation mode in which a DC load 150 performs power saving load operation (for example, standby operation). The "second operation mode" can save more power than in the "first operation mode". For example, the "first operation mode" corresponds to a "normal mode" of an apparatus (for example, an image forming apparatus) in which the power supply controlling apparatus 100 is implemented, and the "second operation mode" corresponds to a "power saving mode" or a "standby mode" of an apparatus in which the power supply controlling apparatus 100 is implemented. For example, in the image forming apparatus, when the job request is not received for a certain period of time or a user operation is not given to an operation panel, the "normal mode" is switched to the "power saving mode" or the "standby mode". The power supply controlling apparatus 100 performs a constant current control in the "second operation mode" in order to maintain the input power from the commercial power supply 110 at the environmental regulation value.

First Example (Configuration of the Power Supply Controlling Apparatus 100A)

FIG. 3 is a diagram illustrating a configuration of a power supply controlling apparatus 100A according to the first embodiment of the present invention. The power supply controlling apparatus 100A illustrated in FIG. 3 illustrates one embodiment of the power supply controlling apparatus 100 illustrated in FIG. 1.

As illustrated in FIG. 3, the power supply controlling apparatus 100A according to the first embodiment includes a commercial power supply 110, a power detecting unit 120, a first power supply unit 130, a second power supply unit 140, a DC load 150, a first block diode 161, and a second block diode 162.

The power detecting unit 120 includes a voltage detecting unit 121, a current detecting unit 122, and a reporting unit 123. The voltage detecting unit 121 detects the input voltage of the power input from the commercial power supply 110 to the first power supply unit 130. The current detecting unit 122 detects the input current of the power input from the commercial power supply 110 to the first power supply unit 130. The reporting unit 123 notifies the output voltage setting unit 135 of the first power supply unit 130 of the input voltage detected by the voltage detecting unit 121 and the input current detected by the current detecting unit 122.

The first power supply unit 130 includes a noise filter 131, a rectifier/smoother unit 132, and a converter unit 133. A noise filter 131 removes noise from the utility power input from the commercial power supply 110. The rectifier/smoother unit 132 rectifies and smooths the commercial power input from the commercial power supply 110. The converter unit 133 converts commercial power input from the commercial power supply 110 from AC to DC power.

The converter unit 133 includes a control unit 134 and an output voltage setting unit 135. The output voltage setting unit 135 sets the output voltage of the first power supply unit 130 to increase or decrease based on the input voltage and the input current notified from the reporting unit 123. The control unit 134 is an example of "control means" and controls the output voltage of the first power supply unit 130 based on the output voltage set by the output voltage setting unit 135.

For example, when the output voltage of the second power supply unit 140 becomes equal to the output voltage of the first power supply unit 130, the output currents of both sources become approximately equal. When the output voltage of the second power supply unit 140 differs from the output voltage of the first power supply unit 130, the output current of the first power supply unit 130 and the second power supply unit 140 with the higher output voltage becomes higher. For example, the control unit 134 raises or lowers the output voltage of the first power supply unit 130 so as to adjust the balance between the output current of the first power supply unit 130 and the output current of the second power supply unit 140.

The control unit 134 controls the output voltage of the first power supply unit 130 to control the input current of the commercial power supply to a constant current value of an upper limit current (environmental regulation value) corresponding to the input voltage of the commercial power supply. Specifically, the control unit 134 determines an upper limit current value (environmental regulation value) of an input current from the commercial power supply 110 according to an input voltage (an input voltage notified from the reporting unit 123) from the commercial power supply 110 based on a setting table illustrated in FIG. 4. For example, when the input voltage reported from the reporting unit 123 is "100 V," the control unit 134 determines the upper limit current value (the environmental regulation value) of the input current from the commercial power supply 110 to be "3 mA" based on a setting table illustrated in FIG. 4. In this case, when the input current from the commercial power supply 110 (the input current reported from the reporting unit 123) is "3 mA" or smaller, the control unit 134 increases the output voltage of the first power supply unit 130 to increase the power supply from the first power supply unit 130 so that a current preferentially flows to the DC load 150 from the first power supply unit 130. Conversely, when the input current from the commercial power supply 110 (the input current notified from the reporting unit 123) is not smaller than "3 mA", the control unit 134 decreases the output voltage of the first power supply unit 130 and reduces the power supply from the first power supply unit 130 so that a current preferentially flows to the DC load 150 from the second power supply unit 140. Thus, the control unit 134 controls the input current from the commercial power supply 110 at a constant current so that the input current from the commercial power supply 110 is constant at "3 mA".

In the power supply controlling apparatus 100A, a first block diode 161 is provided in the power supply path from the first power supply unit 130, and a second block diode 162 is provided in the power supply path from the second power supply unit 140. This allows the power supply controlling apparatus 100A to prevent the flow of current from the first power supply unit 130 to the second power supply unit 140 and the flow of current from the second power supply unit 140 to the first power supply unit 130.

(Example of Setting Table Provided by Power Supply Controlling Apparatus 100A)

FIG. 4 is a diagram illustrating an example of a setting table provided by the power supply controlling apparatus 100A according to the first embodiment of the present invention. As illustrated in FIG. 4, the setting table provided with the power supply controlling apparatus 100A sets the upper limit current value (3 mA, 2.7 mA, 2.5 mA) for each input voltage (100 V, 110 V, and 120 V). These upper current limits are used to limit the input power from the commercial power supply 110 to "0.3 W", an example of the environmental regulation values stipulated in Europe. The setting table illustrated in FIG. 4 is stored in a memory provided by the power supply controlling apparatus 100A and is referred to when the control unit 134 determines an upper limit current value of the input current.

(An Operation Procedure of Power Supply Controlling Apparatus 100A)

Figure 5:
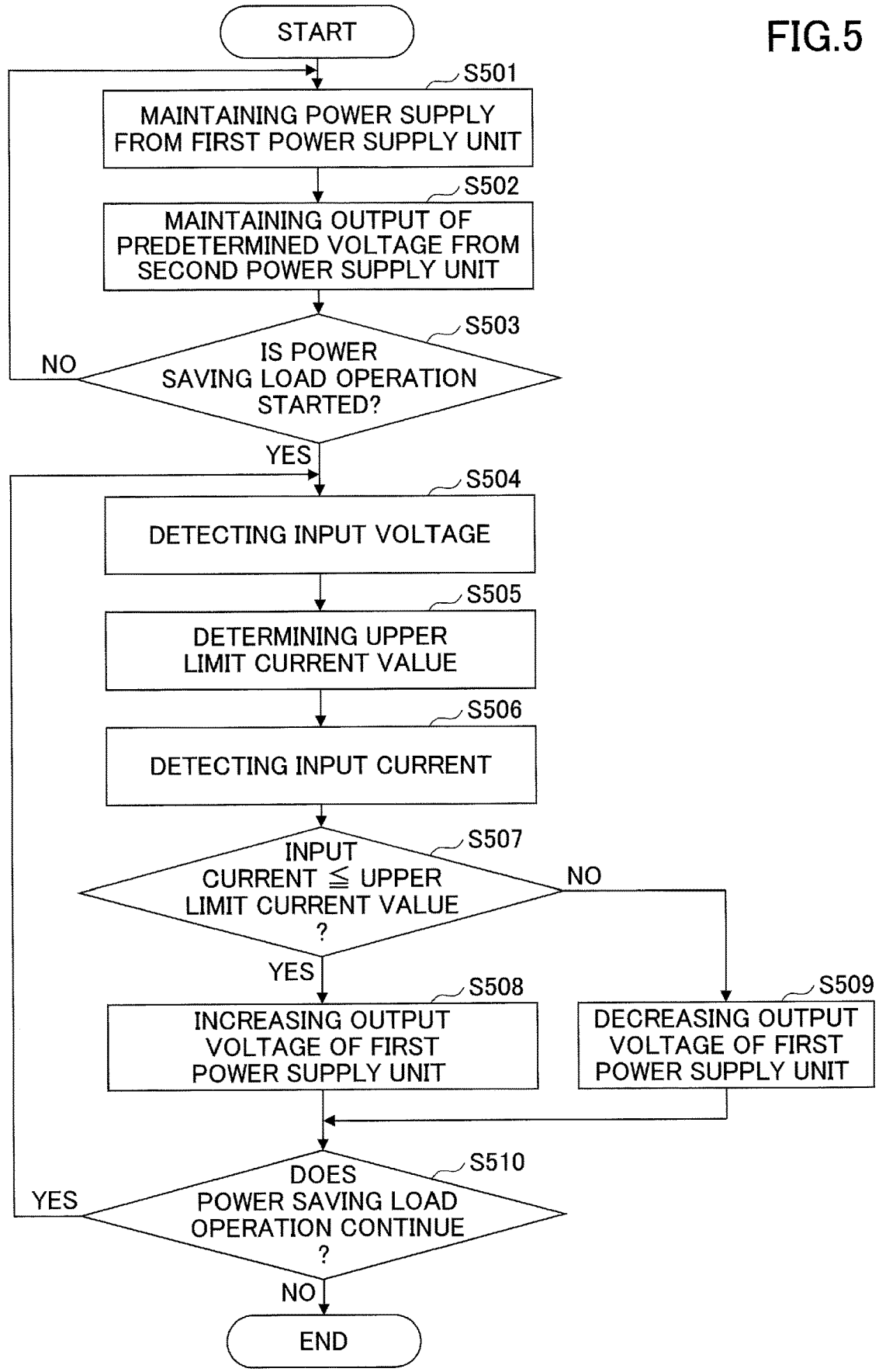
FIG. 5 is a flowchart illustrating an operation procedure of the power supply controlling apparatus according to the first embodiment of the present invention.

FIG. 5 is a flowchart illustrating an operation procedure of the power supply controlling apparatus 100A according to the first embodiment of the present invention.

First, in the power supply controlling apparatus 100A, a supply of the DC power from the first power supply unit 130 to the DC load 150 is maintained (step S501). In parallel with this, a constant voltage output from the second power supply unit 140 is maintained (step S502).

Next, in step S503, the power supply controlling apparatus 100A determines whether the DC load 150 starts a power saving load operation (Said differently, whether it is switched over to the "second operation mode"). In step S503, when it is determined that the DC load 150 does not start the power saving load operation (step S503: NO), the power supply controlling apparatus 100A returns to the process of step S501.

Meanwhile, in step S503, when it is determined that the DC load 150 has started the power saving load operation (step S503: YES), the voltage detecting unit 121 detects the input voltage from the commercial power supply 110 (step S504). Further, the control unit 134 determines the upper limit current value of the input current from the setting table illustrated in FIG. 4 based on the input voltage detected in Step S503 (step S505).

Next, when the current detecting unit 122 detects the input current from the commercial power supply 110 (Step S506), the control unit 134 determines whether the input current detected in step S506 is equal to or smaller than the upper limit current value determined in Step S505 (Step S507). In step S507, the control unit 134 may determine whether the average value of the plurality of input current values detected during a predetermined period of time (for example, 60 minutes) is equal to or smaller than the upper limit current value determined in step S505.

In Step S507, when it is determined that the input current is the upper limit current value or smaller (step S507: YES), the control unit 134 increases the output voltage of the first power supply unit 130 (Step S508). With this, the control unit 134 increases the output voltage of the first power supply unit 130 higher than the output voltage of the second power supply unit 140 so that current flows preferentially from the first power supply unit 130 to the DC load 150, and maintains the input current from the commercial power supply 110 at the upper limit current value. Then, the power supply controlling apparatus 100A proceeds the process to Step S510.

Meanwhile, in step S507, when it is determined that the input current is not equal to or smaller than the upper limit current value (Step S507: NO), the control unit 134 decreases the output voltage of the first power supply unit 130 (step S509). With this, the control unit 134 decreases the output voltage of the first power supply unit 130 to be lower that the output voltage of the second power supply unit 140 so that current flows preferentially from the second power supply unit 140 to the DC load 150, and maintains the input current from the commercial power supply 110 at the upper limit current value. Then, the power supply controlling apparatus 100A proceeds the process to step S510.

In step S510, it is determined whether the DC load 150 continues the power saving load operation. In step S510, when it is determined that the DC load 150 continues the power saving load operation (step S510: YES), the power supply controlling apparatus 100A returns the process to step S504. Meanwhile, in Step S510, when it is determined that the DC load 150 does not continue the power saving load operation (step S510: NO), the power supply controlling apparatus 100A ends a series of operations illustrated in FIG. 5.

Second Embodiment (Configuration of Power Supply Controlling Apparatus 100B)

Figure 6:
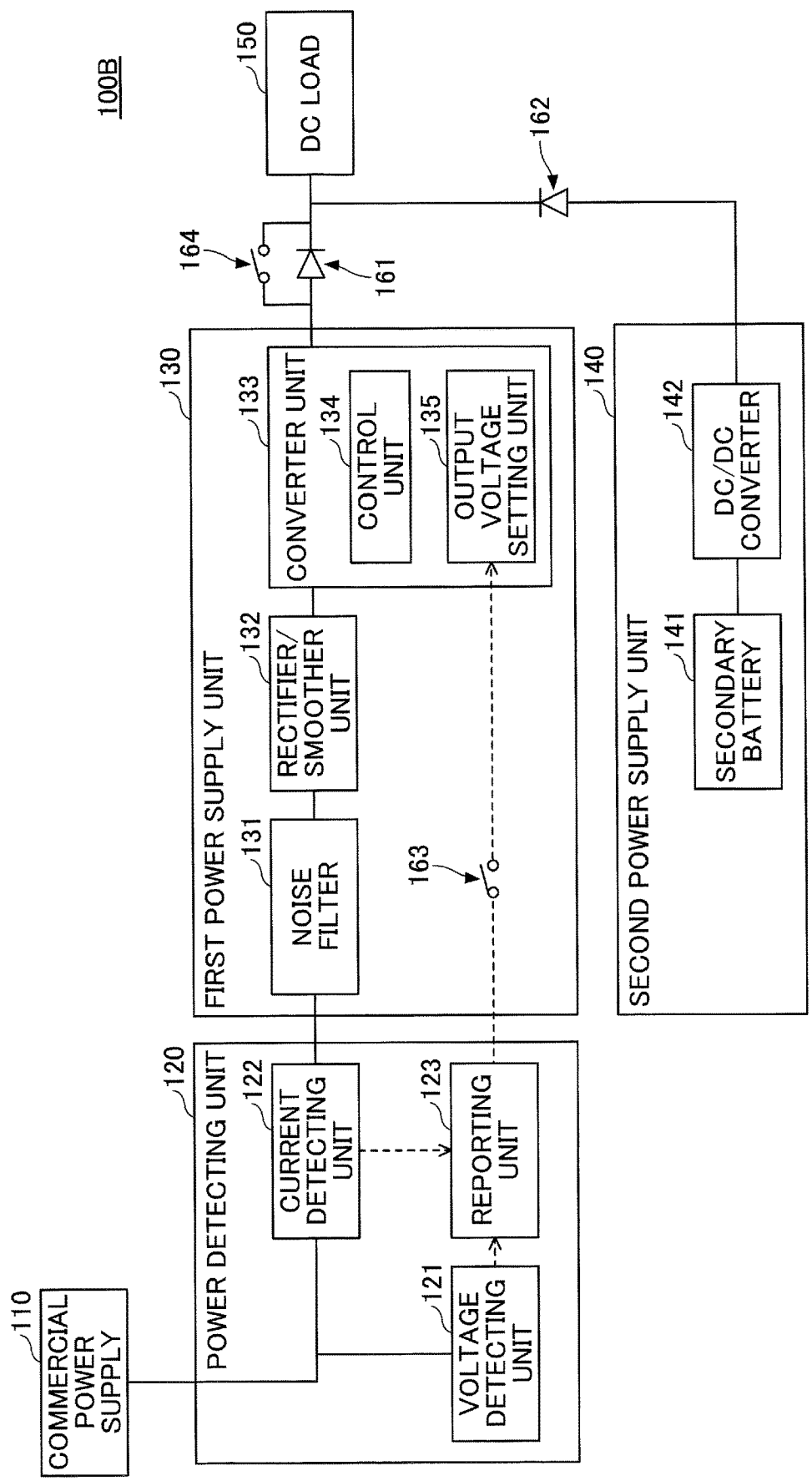
FIG. 6 illustrates a configuration of the power supply controlling apparatus according to a second embodiment of the present invention.

FIG. 6 is a diagram illustrating a configuration of a power supply controlling apparatus 100B according to a second embodiment of the present invention. The power supply controlling apparatus 100B illustrated in FIG. 6 relates to another embodiment of the power supply controlling apparatus 100 illustrated in FIG. 1. The power supply controlling apparatus 100B differs from the power supply controlling apparatus 100A illustrated in FIG. 3 in that it further includes switches 163, 164.

A switch 163 is provided between the reporting unit 123 and the output voltage setting unit 135. The switch 164 is connected in parallel with the first block diode 161 between the first power supply unit 130 and the DC load 150.

In the power supply controlling apparatus 100B, in the "first operation mode", when high power is supplied from the first power supply unit 130, if the switch 163 is opened, the first power supply unit 130 does not receive a signal from the reporting unit 123, and the output voltage (a voltage higher than the output voltage of the second power supply unit 140) can be set by the first power supply unit 130 itself and the DC power having the output voltage can be supplied to the DC load 150.

Accordingly, the power supply controlling apparatus 100B can supply power such that the input power from the commercial power supply 110 is equal to or more than the environmental regulation value at a time when the product is operated without being subject to the environmental regulation value restriction (for example, a copy operation in the "normal operation mode" of the MFP (Multi Function Peripheral) or the like).

In addition, in the power supply controlling apparatus 100B, when the large power is supplied from the first power supply unit 130, both ends of the first block diode 161 are shorted by the switch 164, thereby avoiding power loss caused by the first block diode 161. It should be noted that the switches 163 and 164 may use any device that is capable of switching an electrically conductive state, such as a relay or a field effect transistor.

Third and Fourth Embodiments (Configuration of Power Supply Controlling Apparatus 100C, 100D)

Figure 7:
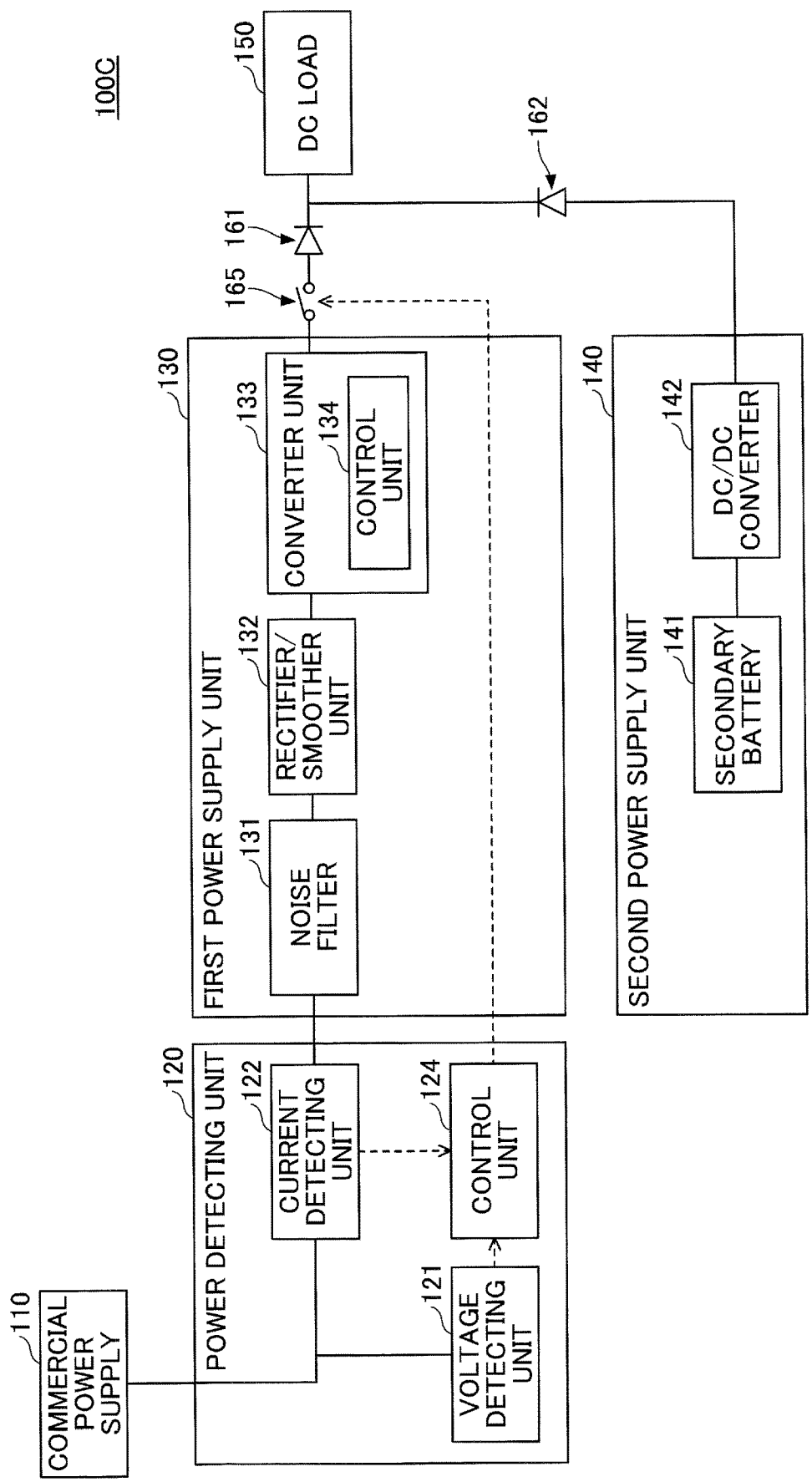
FIG. 7 is a diagram illustrating a configuration of the power supply controlling apparatus according to a third embodiment of the present invention.
Figure 8:
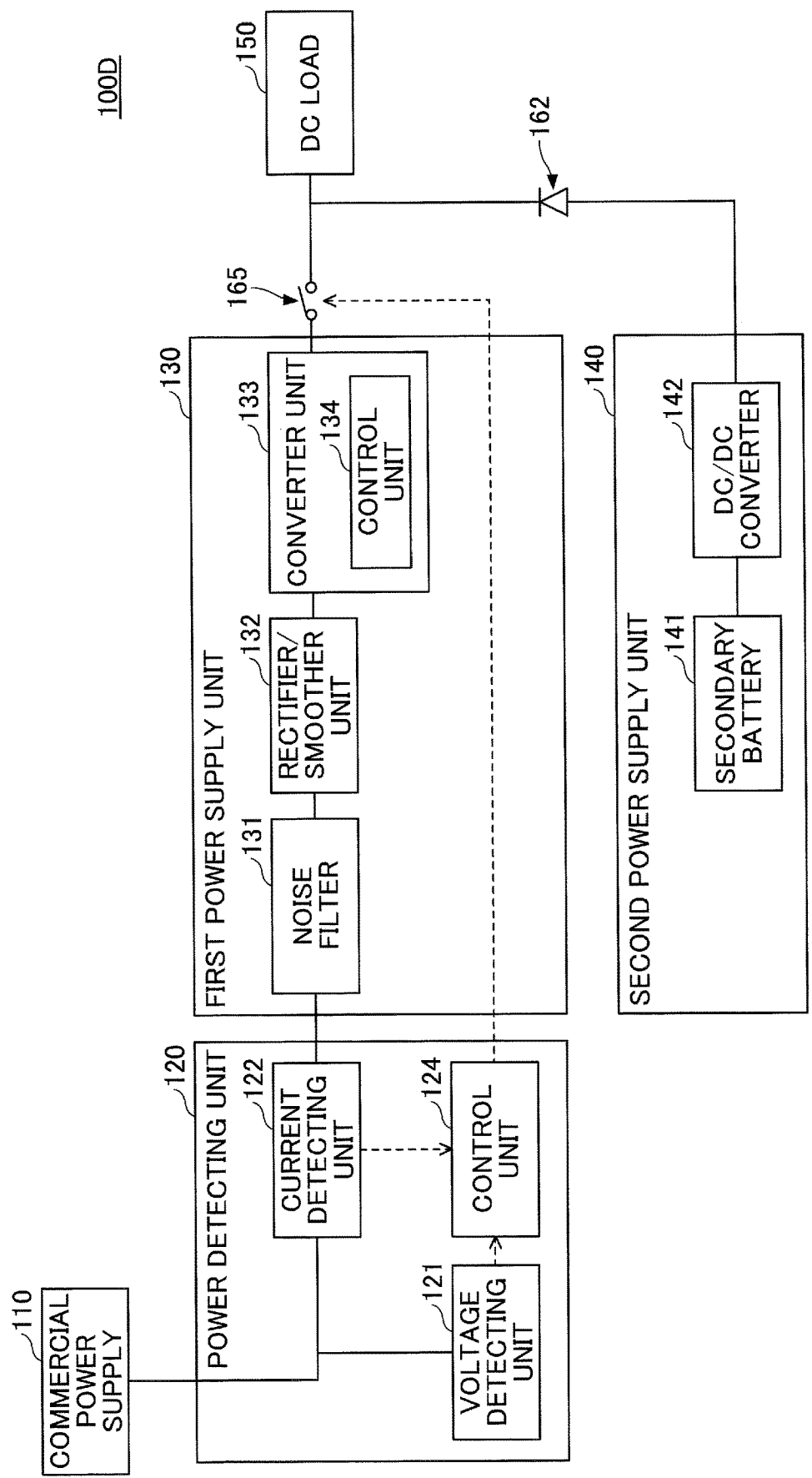
FIG. 8 is a diagram illustrating a configuration of the power supply controlling apparatus according to a fourth embodiment of the present invention.

FIG. 7 is a diagram illustrating a configuration of the power supply controlling apparatus 100C according to a third embodiment of the present invention. FIG. 8 is a diagram illustrating a configuration of a power supply controlling apparatus 100D according to a fourth embodiment of the present invention.

The power supply controlling apparatuses 100C and 100D illustrated in FIGS. 7 and 8 illustrate yet another embodiment of the power supply controlling apparatus 100 illustrated in FIG. 1. The power supply controlling apparatus 100C illustrated in FIG. 7 differs from the power supply controlling apparatus 100A illustrated in FIG. 3 in that the power supply controlling apparatus 100C further includes a switch 165, the output voltage setting unit 135 is not provided, and the power detecting unit 120 includes the control unit 124 (another example of a "control means") instead of the reporting unit 123. The power supply controlling apparatus 100D illustrated in FIG. 8 differs from the power supply controlling apparatus 100C illustrated in FIG. 7 in that the power supply controlling apparatus 100D does not have a first block diode 161.

In the power supply controlling apparatuses 100C and 100D, the output balance between the first power supply unit 130 and the second power supply unit 140 can be adjusted by controlling the switch 165 provided between the output of the first power supply unit 130 and the DC load 150. Specifically, when the input power from the commercial power supply 110 is greater than or equal to the set power, the switch 165 is released by control from the control unit 124 to prevent the power from being supplied from the first power supply unit 130 to the DC load 150. Meanwhile, when the input power from the commercial power supply 110 is less than the set power, the switch 165 is closed by control from the control unit 124 so that power is supplied from the first power supply unit 130 to the DC load 150. Therefore, the output balance between the first power supply unit 130 and the second power supply unit 140 can be adjusted. It is a prerequisite that the output voltage of the first power supply unit 130 is equal to or more than the output voltage of the second power supply unit 140.

Fifth and Sixth Embodiments (Configuration of Power Supply Controllers 100E and 100F)

Figure 9:
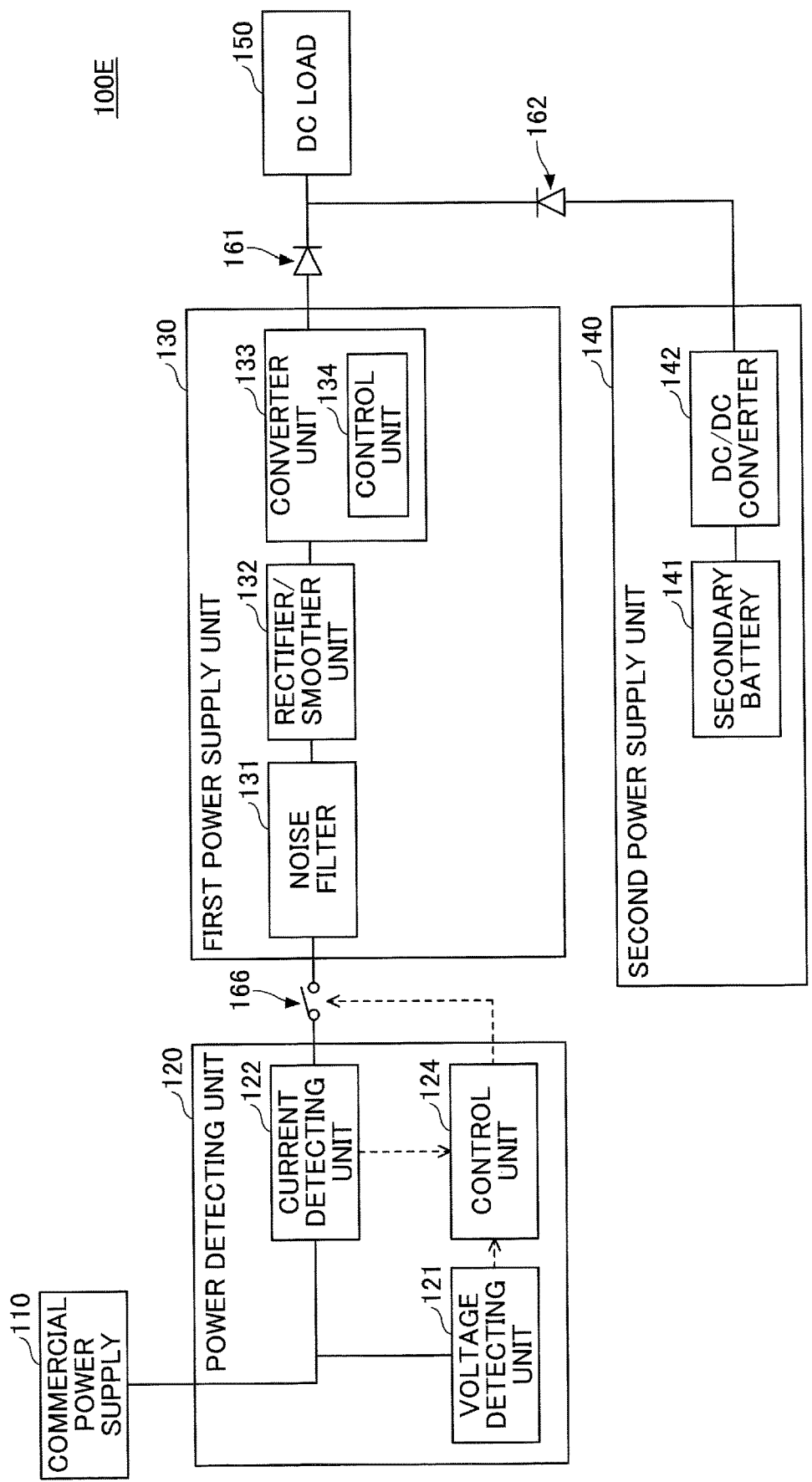
FIG. 9 is a diagram illustrating a configuration of the power supply controlling apparatus according to a fifth embodiment of the present invention.
Figure 10:
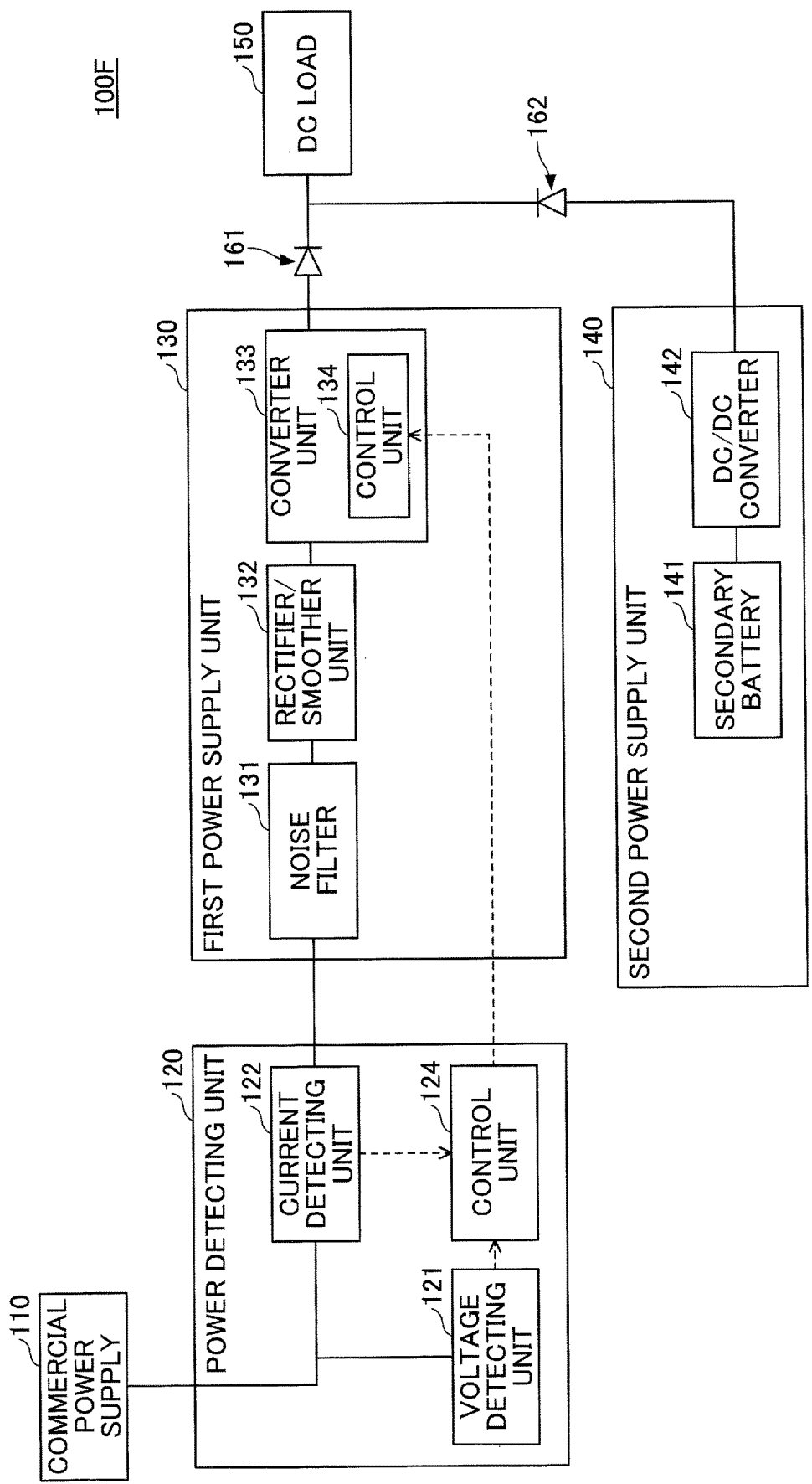
FIG. 10 is a diagram showing a configuration of the power supply controlling apparatus according to a sixth embodiment of the present invention.

FIG. 9 is a diagram illustrating a configuration of the power supply controlling apparatus 100E according to a fifth embodiment of the present invention. FIG. 10 is a diagram illustrating a configuration of the power supply controlling apparatus 100F according to a sixth embodiment of the present invention.

The power supply controlling apparatuses 100E and 100F illustrated in FIGS. 9 and 10 illustrate yet another embodiment of the power supply controlling apparatus 100 illustrated in FIG. 1. The power supply controlling apparatus 100E illustrated in FIG. 9 differs from the power supply controlling apparatus 100C illustrated in FIG. 7 in that it includes a switch 166 instead of a switch 165. The power supply controlling apparatus 100F illustrated in FIG. 10 differs from the power supply controlling apparatus 100C illustrated in FIG. 7 in that the power supply controlling apparatus 100F does not include a switch 165 and the control unit 124 is connected to the control unit 134 of the converter unit 133.

The power supply controlling apparatuses 100E and 100F illustrated in FIGS. 9 and 10 can adjust the output balance between the first power supply unit 130 and the second power supply unit 140 by controlling the operation and stop of the output operation of the first power supply unit 130.

Specifically, the power supply controlling apparatus 100E illustrated in FIG. 9 provides a switch 166 between the output of the power detecting unit 120 and the input of the first power supply unit 130. When the input power from the commercial power supply 110 is equal to or more than the set power, the switch 166 is released by the control from the control unit 124, so that the operation of the first power supply unit 130 is stopped, so that power is not supplied from the first power supply unit 130 to the DC load 150. Meanwhile, when the input power from the commercial power supply 110 is less than the set power, the first power supply unit 130 is operated by closing the switch 165 through control from the control unit 124 so that power is supplied from the first power supply unit 130 to the DC load 150. Therefore, the output balance between the first power supply unit 130 and the second power supply unit 140 can be adjusted.

Further, in the power supply controlling apparatus 100F illustrated in FIG. 10, when the input power from the commercial power supply 110 exceeds the set power, the operation of the converter unit 133 is stopped by the control from the control unit 124 so that the power is not supplied from the first power supply unit 130 to the DC load 150. Meanwhile, when the input power from the commercial power supply 110 is less than the set power, the converter unit 133 is operated by control from the control unit 124 so that power is supplied from the first power supply unit 130 to the DC load 150. Therefore, the output balance between the first power supply unit 130 and the second power supply unit 140 can be adjusted.

As described above, the power supply controlling apparatus 100 of the present embodiment includes a first power supply unit 130 that supplies DC power to a DC load 150 using power supplied from a commercial power supply 110, a second power supply unit 140 that supplies DC power to a DC load 150 using power supplied from a secondary battery 141, a power detecting unit 120 that detects an input voltage and an input current input from a commercial power supply 110 to a first power supply unit 130, and a control unit 124 that controls DC power supplied to a DC load 150 from a first power supply unit 130 on the basis of the input voltage and the input current detected by the power detecting unit 120 to control the input current from a commercial power supply 110 to a current limit set to an upper limit current value corresponding to the input voltage from the commercial power supply 110.

Accordingly, the power supply controlling apparatus 100 in accordance with the present embodiment can control the input power from the commercial power supply 110 to be constant at the environmental regulation value regardless of the increase or decrease of the load current. Accordingly, the power supply controlling apparatus 100 can appropriately control the input power from the commercial power supply in response to the load current.

Further, in the power supply controlling apparatus 100 according to the present embodiment, the control unit 124 can control an increase or a decrease of the DC power supplied from the first power supply unit 130 to the DC load 150 based on the input voltage and the input current detected by the power detecting unit 120 to control the input current to a constant current value of the upper limit current value according to the input voltage.

Accordingly, the power supply controlling apparatus 100 in accordance with the present embodiment can control the input power from the commercial power supply 110 to be constant at the environmental regulation value by performing relatively simple control such as controlling the increase and decrease of the DC power supplied from the first power supply unit 130 to the DC load 150.

The power supply controlling apparatus 100 in accordance with the present embodiment includes a first block diode 161 that is provided at the output of the first power supply unit 130 and prevents current from flowing into the first power supply unit 130 and a second block diode 162 that is provided at the output of the second power supply unit 140 and prevents current from flowing into the second power supply unit 140.

Accordingly, the power supply controlling apparatus 100 according to the present embodiment can prevent both the flow of current from the second power supply unit 140 to the first power supply unit 130 and the flow of current from the first power supply unit 130 to the second power supply unit 140. Accordingly, in the power supply controlling apparatus 100 according to the present embodiment, it is possible to suppress the deterioration of the utilization efficiency for each of the output power from the first power supply unit 130 and the output power from the second power supply unit 140.

Further, in the power supply controlling apparatus 100 according to the present embodiment, when the DC load 150 requires a larger power than the DC power supplied from the first power supply unit 130 by constant current control, the first power supply unit 130 can supply a large power to the DC load 150 regardless of the constant current control.

Accordingly, the power supply controlling apparatus 100 in accordance with the present embodiment can control the input power from the commercial power supply 110 to be constant at the environmental regulation value when the DC load 150 does not require a large power, and when the DC load 150 requires a large power, the power supply controlling apparatus 100 can supply a large power to the DC load 150.

The power supply controlling apparatus 100 according to the present embodiment may be provided in parallel with the first block diode 161 at the output of the first power supply unit 130 as illustrated in FIG. 6, and may be configured with a switch 164 capable of shorting both ends of the first block diode 161 when the DC load 150 requires large DC power.

With this, the power supply controlling apparatus 100 according to the present embodiment can avoid power loss at the first block diode 161. Accordingly, according to the power supply controlling apparatus 100 according to the present embodiment, it is possible to suppress the deterioration in the utilization efficiency of the output power from the first power supply unit 130.

Further, in the power supply controlling apparatus 100 according to the present embodiment, the control unit 124 can control the output of DC power from the first power supply unit 130 based on the input voltage and the input current detected by the power detecting unit 120 to control the input current to a constant current value according to the input voltage, as illustrated in FIGS. 7 to 10.

This allows the power supply controlling apparatus 100 to control the input power from the commercial power supply 110 to be constant at the environmental regulation value by relatively simple control, such as controlling the on and off of the output of the DC power from the first power supply unit 130.

For example, as illustrated in FIGS. 7 and 8, the control unit 124 can control a constant current value of the upper limit current in response to the input voltage by switching the output path of the DC power from the first power supply unit 130 to the DC load 150 between the input voltage and the input current detected by the power detecting unit 120.

For example, as illustrated in FIGS. 9 and 10, the control unit 134 switches the operation and stop of the first power supply unit 130 based on the input voltage and the input current detected by the power detecting unit 120, thereby allowing constant current control of the input current at the upper limit current value in response to the input voltage.

Applied Example

Figure 11:
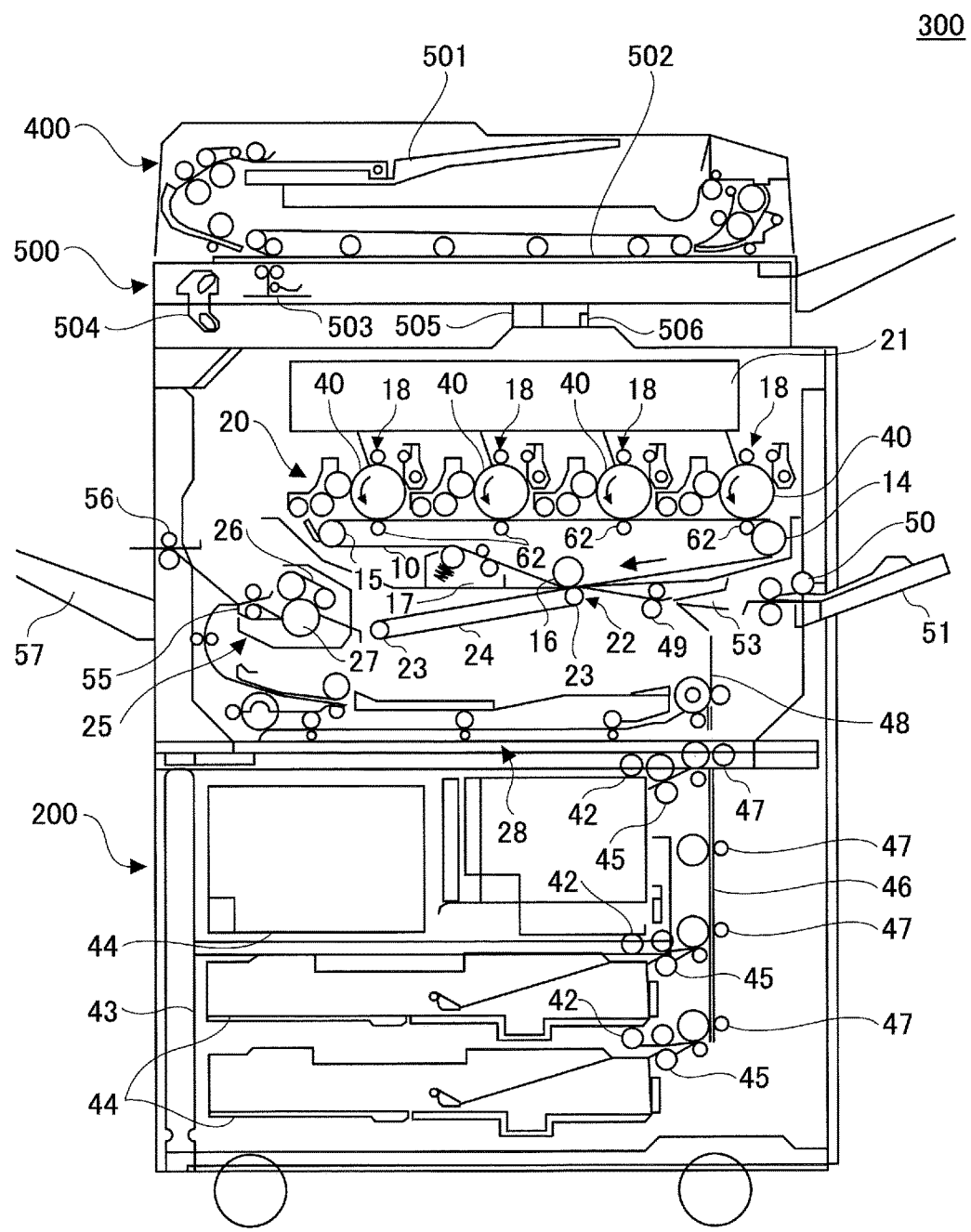
FIG. 11 illustrates an example of the structure of an image forming apparatus according to an embodiment of the present invention.

FIG. 11 illustrates an example of the structure of the image forming apparatus 300 according to an embodiment of the present invention. As illustrated in FIG. 11, the image forming apparatus 300 includes an intermediate transfer unit, an image producing device 20, an exposure unit 21, a secondary transfer unit 22, and a fixing unit 25.

The intermediate transfer unit includes an intermediate transfer belt 10 that is an endless belt, three supporting rollers 14 to 16, and an intermediate transfer body cleaning unit 17. The intermediate transfer belt 10 is hung on each of the support rollers 14 to 16 and rotates clockwise. The intermediate transfer body cleaning unit 17 is disposed between the second support roller 15 and the third support roller 16, and after the image is transferred, residual toner remaining on the surface of the intermediate transfer belt 10 is removed.

The image producing device 20 is disposed between the first support roller 14 and the second support roller 15. The image producing device 20 is disposed in the conveying direction of the intermediate transfer belt 10 in the order of yellow, magenta, cyan, and black.

The image producing device 20 includes a cleaning unit, a charging roller 18, a static neutralizer, a developer, and a photosensitive element drum for each color, and performs image production for each color. The image producing device 20 may be detachable from the image forming apparatus 300.

The exposure unit 21 is disposed above the image producing device 20. The exposure unit 21 irradiates laser light onto the photosensitive drum 40 of each color in order to form an image.

The secondary transfer unit 22 is disposed below the intermediate transfer belt 10 and has two rollers 23 and a secondary transfer belt 24. The secondary transfer belt 24 is an endless belt that is hung on each of two rollers 23 and rotates. The roller 23 and the secondary transfer belt 24 are mounted so as to push the intermediate transfer belt 10 up against the third support roller 16. The secondary transfer belt 24 transfers an image formed on the intermediate transfer belt 10 to a paper sheet P.

The fixing unit 25 is disposed on the side of the secondary transfer unit 22 and has a fixing belt 26 and a pressure roller 27. When the paper sheet P on which the toner image is transferred is sent to the fixing unit 25, the fixing unit 25 fixes the toner image to the paper sheet P. The fixing belt 26 is an endless belt and the pressure roller 27 is mounted to press against the fixing belt 26.

A sheet reversing unit 28 is provided below the secondary transfer unit 22 and the fixing unit 25. The sheet reversing unit 28 reverses the front and back surfaces of the fed paper sheet P. The sheet reversing unit 28 is used to produce the image on the front surface and then the image on the back surface.

An automatic document feeder (ADF) 400 conveys the paper sheet P onto a contact glass 502 when a start button provided on the operation unit is depressed in a case where the paper sheet P is on a sheet feed table 501. On the other hand, when there is no paper sheet P on the sheet feed table 501, the automatic document feeder 400 activates an image reading unit 500 to read the paper sheet P on the contact glass 502 placed by a user.

The image reading unit 500 includes a first carriage 503, a second carriage 504, an imaging lens 505, a charge coupled device (CCD) 506, and a light source. The image reading unit 500 drives the first carriage 503 and the second carriage 504 to read the paper sheet P on the contact glass 502.

A light source that the first carriage 503 has emits light toward the contact glass 502. The light from the light source is reflected by the paper sheet P on the contact glass 502 and then reflected toward the second carriage 504 by the first mirror provided on the first carriage 503. The light reflected by the second carriage 504 is imaged by the imaging lens 505 at a CCD 506 that is a read sensor.

The image forming apparatus 300 produces image data of each color, that is Y, M, C, and K, based on the data acquired from the CCD 506.

The image forming apparatus 300 starts the rotation of the intermediate transfer belt 10 when the start button provided in the operating unit is depressed, when an instruction for forming the image is given from an external apparatus such as a personal computer (PC), or when an output instruction is given from a facsimile.

When the rotation of the intermediate transfer belt 10 starts, the image producing device 20 starts an image producing process. The paper sheet P on which the toner image is transferred is fed to the fixing unit 25. The fixing unit 25 fixes the toner image to the paper sheet P and forms the image on the paper sheet P.

A sheet feed table 200 includes a feed roller 42, a sheet feed unit 43, a separation roller 45, and a conveying roller unit 48. The sheet feed unit 43 includes multiple sheet feed trays 44 and the conveying roller unit 48 includes a conveying roller 47.

The sheet feed table 200 selects one of the feed rollers 42. The sheet feed table 200 rotates the selected feed roller 42.

The sheet feed unit 43 selects one of multiple feeding trays 44 and feeds the paper sheet P is fed from the sheet feed tray 44. The supplied paper sheet P is separated to each sheet by the separation roller 45 and conveyed to the conveying pass. Then, it is separated and conveyed to a conveying passage. The paper sheet P is conveyed by the conveying roller 47 in the conveying passage 46. The paper sheet P is conveyed to the image forming apparatus 300.

The paper sheet P conveyed to the image forming apparatus 300 is conveyed to the resist roller 49 through the sheet feed passage 53 and stops by hitting the resist roller 49. Then, the toner image is transmitted to the secondary transfer unit 22 at the timing when it enters the secondary transfer unit 22.

The paper sheet P may be sent from the manual feed tray 51. When the paper sheet P is fed from the manual feed tray 51, the image forming apparatus 300 rotates the paper feed roller 50. The sheet feed roller 50 separates one sheet from multiple paper sheets disposed on the manual feed tray 51 and conveys the separated paper sheets P to the sheet feed passage 53. The paper sheet P conveyed to the sheet feeding passage 53 is further conveyed to the resist roller 49. The process after the paper sheet P is conveyed to the resist roller 49 is similar to a case where the paper sheet P is conveyed from the sheet feed table 200.

The paper sheet P is discharged after the fixing step is performed by the fixing unit 25. The discharged paper sheet P is fed to the discharging roller 56 by a changeover claw 55. The discharge roller 56 feeds the paper sheet P to the discharge tray 57 and discharges the paper sheet P.

The changeover claw 55 may convey the paper sheet P discharged from the fixing unit 25 to a sheet reversing unit 28. The sheet reversing unit 28 reverses the front and back surfaces of the conveyed paper sheet P. The reversed paper sheet P is imaged on the back surface similarly to the surface and conveyed to the discharge tray 57. As described above, the image forming apparatus 300 performs image formation on the paper sheet P.

The image forming apparatus 300 configured in this manner includes any of the power supply controlling apparatus described in the embodiments, so that the power supply controlling apparatus can control the input power from the commercial power source 110 to be constant according to the environmental regulation value regardless of the increase or decrease of the load current.

According to the present invention, the input power from the commercial power supply can be appropriately controlled in response to the load current.

While the preferred embodiments and embodiments of the invention have been described in detail above, the invention is not limited to these embodiments and embodiments, and various modifications or variations are possible within the scope of the invention as defined in the appended claims.

Explanation of numerical references is as follows:
100,100A to 100F Power supply controlling apparatus
110 Commercial power supply
120 Power detecting unit
121 Voltage detecting unit
122 Current detecting unit
123 Reporting unit
124 Control unit (control means)
130 First power supply unit
131 Noise filter
132 Rectifier/smoother unit
133 Converter unit
134 Control unit (control means)
135 Output voltage setting unit
140 Second power supply unit
141 Secondary battery
142 DC/DC converter
150 DC load
161 First block diode
162 Second block diode
163,164,165,166 Switch
300 Image forming apparatus

What is claimed is:

1. A power supply controlling apparatus comprising:
a first power supply unit that supplies DC power to a load using power supplied from a commercial power supply;
a power detecting unit that detects an input voltage and an input current input from the commercial power supply to the first power supply unit;
a control unit that controls the input current to be a constant current having an upper limit current value in response to the detected input voltage by controlling DC power supplied to the load from the first power supply unit based on the detected input voltage and the detected input current detected by the power detecting unit;
a second power supply unit that supplies the DC power to the load using power supplied from a secondary battery;
a first block diode provided at an output of the first power supply unit to prevent a current from flowing into the first power supply unit; and
a second block diode provided at an output of the second power supply unit to prevent the current from flowing into the second power supply unit, wherein
the control unit controls the input current to be the constant current having the upper limit current value corresponding to the detected input voltage and the detected input current, by controlling an increase and a decrease in DC power supplied from the first power supply to the load based on the detected input voltage and the detected input current,
a first operation mode and a second operation mode are performed, the second operation mode saving power more than the first operation mode,
in the first operation mode, in a case where the load requires power higher than DC power supplied from the first power supply unit using a constant current control, the first power supply unit can supply higher power to the load, and
in the second operation mode, the control unit performs a constant current control of the input current to have an upper limit current value corresponding to the detected input voltage.

2. The power supply controlling apparatus according to claim 1, the power supply controlling apparatus further comprising:
a switch that is provided in parallel with the first block diode at the output of the first power supply unit and capable of shorting both ends of the first block diode when the load requires the higher power.

3. The power supply controlling apparatus according to claim 1, wherein
the input current is controlled to be the constant current having the upper limit current value in response to the detected input voltage by controlling the output of the DC power from the first power supply based on the detected input voltage and the detected input current.

4. The power supply controlling apparatus according to claim 3, wherein
the control unit controls the input current to be the constant current having the upper limit current value by switching output path of the DC power from the first power supply unit to the load from the first power supply unit to the load based on the detected input voltage and the detected input current.

5. The power supply controlling apparatus according to claim 3, wherein
the control unit controls the input current to be the constant current having the upper limit current value by switching on or off the first power supply unit based on the detected input voltage and the detected input current.

6. A power supply controlling method for controlling a power supply comprising:
supplying DC power via a first power supply to a load using power supplied from a commercial power supply;
detecting an input voltage and an input current input from the commercial power supply via the first power supply;
controlling the input current to be a constant current having an upper limit current value in response to the detected input voltage by controlling DC power supplied via the first supply to the load based on the detected input voltage and the detected input current;
supplying the DC power via a second power supply to the load using power supplied from a secondary battery;
preventing a current from flowing into the first power supply by a first block diode provided at an output of the first power supply; and
preventing the current from flowing into the second power supply by a second block diode provided at an output of the second power supply, wherein
the controlling the input current controls the input current to be the constant current having the upper limit current value corresponding to the detected input voltage and the detected input current by controlling an increase and a decrease in DC power supplied from the first power supply to the load based on the detected input voltage and the detected input current, the power supply controlling method includes a first operation mode and a second operation mode, the second operation mode saving power more than the first operation mode, in the first operation mode, in a case where the load requires power higher than DC power supplied from the first power supply using a constant current control, the first power supply can supply higher power to the load, and in the second operation mode, the input current is controlled by performing a constant current control of the input current to have an upper limit current value corresponding to the detected input voltage.

7. The power supply controlling method according to claim 6, the power supply controlling method further comprising:

shorting both ends of the first block diode when the load requires the higher power by a switch that is provided in parallel with the first block diode at the output of the first power supply.

8. The power supply controlling method according to claim 6, wherein the input current is controlled to be the constant current having the upper limit current value in response to the detected input voltage by controlling the output of the DC power from the first power supply based on the detected input voltage and the detected input current.

9. A non-transitory computer-readable storage medium storing a program for causing a computer to implement a power supply controlling apparatus including a first power supply unit that supplies DC power to a load using power supplied from a commercial power supply;

a power detecting unit that detects an input voltage and an input current input from the commercial power supply to the first power supply unit;

a control unit that controls the input current to be a constant current having an upper limit current value in response to the detected input voltage by controlling DC power supplied to the load from the first power supply unit based on the detected input voltage and the detected input current detected by the power detecting unit;

a second power supply unit that supplies the DC power to the load using power supplied from a secondary battery;

a first block diode provided at an output of the first power supply unit to prevent a current from flowing into the first power supply unit, and a second block diode provided at an output of the second power supply unit to prevent the current from flowing into the second power supply unit, wherein the control unit controls the input current to be the constant current having the upper limit current value corresponding to the detected input voltage and the detected input current, by controlling an increase and a decrease in DC power supplied from the first power supply to the load based on the detected input voltage and the detected input current, a first operation mode and a second operation mode are performed by the power supply controlling apparatus, the second operation mode saving power more than the first saving mode, in the first operation mode, in a case where the load requires power higher than DC power supplied from the first power supply unit using a constant current control, the first power supply unit can supply higher power to the load, and in the second operation mode, the control unit performs a constant current control of the input current to have an upper limit current value corresponding to the detected input voltage.

10. The non-transitory computer-readable storage medium according to claim 9, the power supply controlling apparatus further comprising:

a switch that is provided in parallel with the first block diode at the output of the first power supply unit and capable of shorting both ends of the first block diode when the load requires the higher power.

11. The non-transitory computer-readable storage medium according to claim 9, wherein the input current is controlled to be the constant current having the upper limit current value in response to the detected input voltage by controlling the output of the DC power from the first power supply based on the detected input voltage and the detected input current.

* * * * *